United States Patent
Graupner et al.

(10) Patent No.: US 7,908,605 B1
(45) Date of Patent: Mar. 15, 2011

(54) HIERARCHAL CONTROL SYSTEM FOR CONTROLLING THE ALLOCATION OF COMPUTER RESOURCES

(75) Inventors: Sven Graupner, Mountain View, CA (US); Nigel Cook, Boulder, CO (US); Jean-Marc Chevrot, Thoiry (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 1697 days.

(21) Appl. No.: 11/046,332

(22) Filed: Jan. 28, 2005

(51) Int. Cl.
 *G06F 9/46* (2006.01)
 *G06F 15/173* (2006.01)
(52) U.S. Cl. .................. 718/104; 718/100; 709/226
(58) Field of Classification Search .............. 718/100, 718/102, 104; 719/328; 709/202, 223, 226, 709/316, 318
See application file for complete search history.

(56) References Cited

U.S. PATENT DOCUMENTS

| | | | | |
|---|---|---|---|---|
| 5,682,530 | A * | 10/1997 | Shimamura | 718/104 |
| 5,774,668 | A * | 6/1998 | Choquier et al. | 709/223 |
| 7,054,934 | B2 * | 5/2006 | Graupner et al. | 709/226 |
| 7,150,014 | B2 * | 12/2006 | Graupner et al. | 717/174 |
| 7,644,161 | B1 * | 1/2010 | Graupner et al. | 709/226 |
| 2002/0019864 | A1 * | 2/2002 | Mayer | 709/223 |
| 2002/0174207 | A1 * | 11/2002 | Battou | 709/223 |
| 2003/0037092 | A1 * | 2/2003 | McCarthy et al. | 709/104 |
| 2003/0084156 | A1 * | 5/2003 | Graupner et al. | 709/226 |
| 2003/0140131 | A1 * | 7/2003 | Chandrashekhar et al. | 709/223 |
| 2003/0163555 | A1 * | 8/2003 | Battou et al. | 709/223 |

OTHER PUBLICATIONS

Ahmed, K. et al., "The Cluster as Server: An Integrated Approach to Managing HPC Clusters", Nov. 2002.
Foster, I. et al., "The Grid: Bluepring for a New Computing Infrastructure", Morgan Kaufmann Publishers, ISBN, 1999, p. 270-293.
HP Utility Data Center, http://www.hp.com/go/hpudc, downloaded Jan. 25, 2005.
SmartFrog, http://www.smartfrog.org, downloaded Jan. 25, 2005.
Web Services Management Framework, Version 2.0, http://devresource.hp.com/drc/specifications/wsmf/index.jsp, downloaded Jan. 26, 2005.
IBM : xCAT, Extreme Cluster Administration Toolkit, http://www.alphaworks.ibm.com/tech/xCAT, downloaded Jan. 26, 2005.
Globus: Monitoring and Discovery Service (MDS), http://www.globus.org/mds/mds2, downloaded Jan. 26, 2005.
Global Grid Forum: Open Grid Services Infrastructure v1.0, http://www.gridforum.org/, Jun. 2003.
Oasis: Universal Description, Discovery and Integration (UDDI), http://www.uddi.org, downloaded Jan. 26, 2005.
Sun Microsystems: Sun Grid Engine, http://www.sun.com/software;gridware, downloaded Jan. 26, 2005.

* cited by examiner

*Primary Examiner* — Meng-Ai An
*Assistant Examiner* — Caroline Arcos

(57) ABSTRACT

A control system for controlling the allocation of computer resources includes control plug-ins arranged in a multi-level hierarchy. A first-level control plug-in is operable to generate instructions for a resource manager to allocate computer resources for an application. A second-level control plug-in is operable to generate instructions for the first-level control plug-in to control the allocation of the computer resources for the application.

18 Claims, 5 Drawing Sheets

HIERARCHAL CONTROL SYSTEM FOR CONTROLLING THE ALLOCATION OF COMPUTER RESOURCES

TECHNICAL FIELD

This technical field relates generally to a hierarchal control system for allocating computer resources.

BACKGROUND

Grid computing services, utility-based data centers, and other types of resource-on-demand systems are becomingly increasingly popular as a highly scalable means for utilizing computer resources to meet the computing demands of users. However, managing these resource-on-demand systems is a difficult task that typically requires a significant amount of time and labor and which conventional network management software is not designed to handle.

Many management tasks are performed manually, which tends to be time consuming and costly. For example, selecting computer resources from a pool of resources to assign to a particular user's computing demands is typically performed manually. The monitoring of the pool of resources may be performed using conventional management tools. However, several hundred system administrators may be required, especially for large resource on demand systems such as large utility data centers, to make resource allocation decisions. In addition, current resource-on-demand systems may not efficiently utilize available resources from the resource pool. For example, in many systems, resources remain idle and unused if not assigned to a particular user, even if assigning the idle resources may result in increased efficiency for the user's applications.

SUMMARY

According to an embodiment, a hierarchal control system for controlling the allocation of computer resources includes a first-level control plug-in and a second-level control plug-in. The first-level control plug-in is operable to generate instructions for a resource manager to allocate computer resources for an application. The second-level control plug-in is operable to generate instructions for the first-level control plug-in to control the allocation of the computer resources for the application.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION

For simplicity and illustrative purposes, the principles of the embodiments are described. However, one of ordinary skill in the art would readily recognize that the same principles are equally applicable to, and can be implemented in, all types of systems, and that any such variations do not depart from the true spirit and scope of the embodiments. Moreover, in the following detailed description, references are made to the accompanying figures, which illustrate specific embodiments. Electrical, mechanical, logical and structural changes may be made to the embodiments without departing from the spirit and scope of the embodiments.

Figure 1:
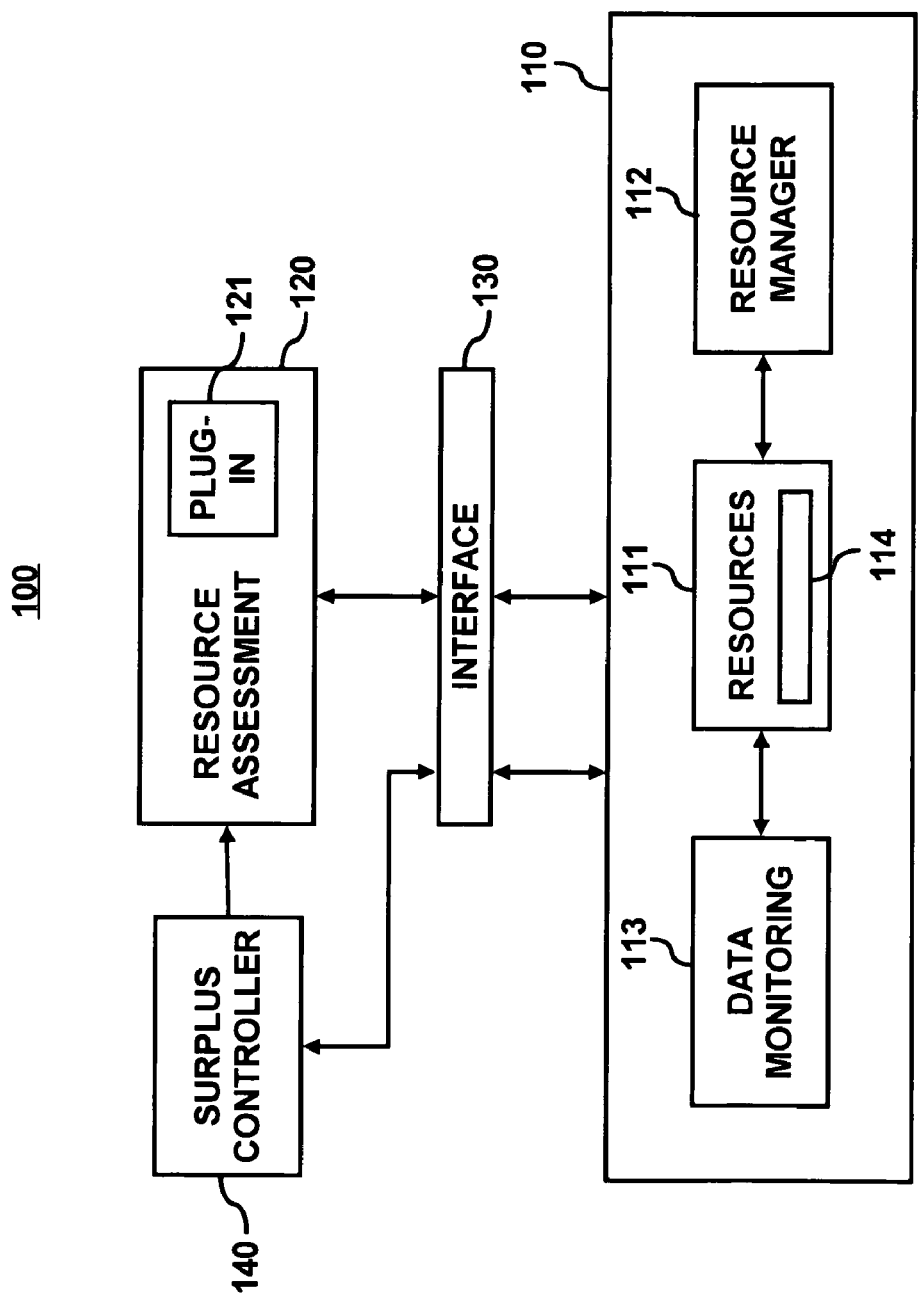
FIG. 1 illustrates a system, according to an embodiment.

FIG. 1 illustrates a system 100 according to an embodiment that provides computer resources on demand and is operable to adjust allocated computer resources as needed. The system 100 includes a resource infrastructure 110 and a resource assessment computer system 120. The resource assessment computer system 120 includes a control plug-in 121 that includes a specifiable policy for allocating computer resources in the resource infrastructure 110. The control plug-in 121 may include parameters and a control function. The control plug-in 121 and other control plug-ins, not shown, may be software that is customizable and executed by the resource assessment computer system 120 for implementing different policies. Control plug-ins are described in further detail below. Furthermore, the resource assessment computer system 120 may include one or a plurality of computer systems, such as one or more servers. Each resource assessment computer system may include and run one or more control plug-ins.

The resource infrastructure 110 includes a pool of computer resources 111, a resource manager computer system 112, and a data monitoring system 113. The resource manager computer system 112 receives instructions for allocating computer resources from the pool of computer resources 111 for a user's computing needs, such as allocating computer resources for a user's application 114. Based on the instructions the resource manager computer system 112 increases or decreases the computer resources allocated for the application 114. The application 114, which is shown in the pool of computer resources 111, is running on a subset of the pool of resources 111 allocated to the application 114 by the resource manager computer system 112. The data monitoring system 113 monitors predetermined metrics of the allocated computer resources and sends monitoring data, which includes measurements of the predetermined metrics, to the resource assessment computer system 120. Examples of the predetermined metrics may include CPU utilization, process queue lengths, IO and network bandwidth, memory utilization and swap rate. If the system 100 is implemented in a data center, the metrics may be collected by data center management software. If application data monitoring is provided, application-level metrics for the application 114 can also be collected, such as transaction rates, response times, numbers of simultaneous sessions, number of users, etc.

The pool of resources 111 may include computer systems or even components of computer systems. One feature of the system 100 is that the number of resources from the pool of resources 111 allocated to an application, such as the application 114, may change during run-time depending on demand the application is facing. Those resources can be flexed which means their capacity can be varied over time. Examples of those resources may include number of CPUs, number of variable server partitions on computer systems that support CPU partitioning, number of entire servers, or varying CPU allocations for or numbers of virtual machines. Resources from the pool of resources 111 are allocated for the application 114. Allocating may include but is not limited to adding servers into an application environment, configuring the servers to run in the application environment, which may include loading the necessary software, releasing servers and un-configuring the released servers from the application environment. CPUs, virtual machines, server partitions, and other types of resources may be similarly configured or un-configured as needed. The allocated computer resources for the application 114 may be adjusted by the resource manager computer system 112.

In one embodiment, the resources are comprised of a server group including a plurality of servers of the same type. Server types may include servers for applications such as web servers, database servers, application servers, and servers used for any type of enterprise application. Examples of server types may include IA32 or 1p2000. The application 114 executed by the server group may be a horizontally-scalable application. A horizontally-scalable application is an application that runs on a number of servers in the server group simultaneously. Scalable means that the number of servers may be changed over time. Several instances of the application may be run by the server group. For example, an instance of a web application for online shopping may be duplicated for each user buying goods or services using the web application. During busy shopping seasons when demand to the e-commerce application is increasing, the resource manager computer system 112 may increase the number of servers in the server group as needed to accommodate the heavier workload. The amount of resources allocated to the application 114 may be adjusted for several reasons, including workload, improving resource utilization (e.g., one or more servers are idle), or supporting other applications hosted by other resources from the pool of resources 111. The environment of the system 100 may be any type of resources on demand environment, which may range from grid computing services to data center services where resources are allocated as needed to one or more applications.

In one embodiment, the allocated resources are comprised of a server group including a plurality of servers of the same type. Examples of server types may include web servers, database servers, application servers, and servers used for any type of enterprise application. The application 114 executed by the server group may be a horizontally-scalable application. A horizontally-scalable application is an application that runs on a number of servers in the server group simultaneously. Several instances of the application may be run by the server group. For example, an instance of a web application for online shopping may be duplicated for each user buying goods or services using the web application. During busy shopping seasons, the resource manager computer system 112 may increase the number of servers in the server group as needed to accommodate the heavier workload. The amount of resources allocated to the application 114 may be adjusted for several reasons, including workload, improving resource utilization (e.g., one or more servers are idle), or supporting other applications hosted by other resources from the pool of resources 111. The environment of the system 100 may be any type of resources on demand environment, which may range from grid computing services to data center services where resources are allocated as needed to one or more applications.

The resource infrastructure 110 contains all the resources 111 managed by the resource manager computer system 112. The resource manager computer system 112 may be managing several different sets of allocated computer resources for different users running different applications, and the resource assessment computer system 121 may be running several different control plug-ins for each application. A protected domain is formed around the resource infrastructure 111 to prevent unauthorized access to the allocated resources and the resource manager 112, for example, from an unrelated control plug-in, a computer virus, or other unauthorized applications.

An interface 130 is used to implement a protected domain around the resource infrastructure 110. The interface 130 provides security measures for crossing protected domains, such as a domain for the resource assessment computer system 120 and a domain for the resource infrastructure 110. Examples of the data the flows between the protected domains may include requests for monitoring data, such as from the resource assessment computer system 120, and the monitoring data included in the responses to the requests, such as provided by the data monitoring system 113. Also, instructions for adjusting allocated resources may be sent from the resource assessment computer system 120 to the resource manager computer system 112 via the interface 130. Examples of the security measures provided by the interface 130 may include control plug-in authentication and establishing encrypted communication channels. Control plug-ins may be authenticated using certificates. For example, a control plug-in's certificate is validated by the interface 130. Only certificates that are registered at the interface 130 can be validated. Encrypted communication channels can be created as is known in the art. The interface 130 may include software and/or hardware in the computer assessment system 120 and the resource manager computer system 112. In one example, the Open Grid Services Infrastructure (OGSI) or the Web Service Resource Framework (WSRF) is used to implement the interface 130. OGSI and WSRF are standards that define mechanisms for creating, managing, and exchanging information among entities. The mechanisms specified in these standards may be used to provide one or more of the security measures for the interface 130.

The system 100 also includes a surplus controller 140, which also may include a computer system. The surplus controller 140 receives monitoring data from the data monitoring system 113 via the interface 130. The surplus controller 140 determines whether to reallocate computer resources for the application 114 based on surplus computer resources. Surplus computer resources are computer resources in the pool of resources 111 not being used. The surplus controller 140 may communicate with the resource assessment computer system 120 and the control plug-in 121 and possibly other control plug-ins not shown to allocate surplus computer resources. For example, if a sufficient number of surplus computer resources are available in the pool of computer resources 111, the surplus controller 140 may instruct the control plug-in 121 to modify one or more parameters used by the control plug-in 121 such that the control plug-in 121 determines that more computer resources may be allocated to the application 114.

The resource assessment computer system 120, using the policy provided in the control plug-in 121 and the monitoring data, including the metrics from the data monitoring system 113, determines whether the application 114 and the allocated resources executing the application 114 are operating within defined bounds, such as specified in the control plug-in 121. The rules for this assessment is the policy specified in the control plug-in 121. Based on the assessment, the resource assessment computer system 120 may take corrective action, such as instructing the resource manager computer system 112 to increase or decrease the computer resources allocated to the application 114.

Policies in control plug-ins may be specified through control functions and parameters in the control plug-ins. The control function in a control plug-in may use one or more parameters for assessing allocated resources. In a simple case, a control function in a control plug-in uses upper and lower threshold parameters. For example, parameters of the control plug-in 121 specify an upper and lower threshold for the current load level of a server group allocated for the application 114. When the load level surpasses the upper threshold, the control plug-in 121 makes a decision to flex up, i.e., add more servers into the server group. When the load level falls below the lower threshold, the control plug-in 121 decides to flex down, i.e., release servers from the server group. A third parameter may include a time interval within which load levels have to remain above the upper or below the lower threshold in order to trigger a resource adjustment. The load level may be determined by the metrics measured by the data monitoring system 113 and transmitted to the resource assessment computer system 120. For example, a current load level of a server group may be an aggregate number of metrics for each server, such as CPU load, memory usage, IO activity, and possibly other metrics.

An example of a control function used in a control plug-in may be described as follows:

F(p1, p2, p3, . . . )→newN with newN=curN (no change)
newN>curN (flex up)
newN<curN (flex down)

The control function F calculates a new target number of resources (newN) that satisfies desired performance under current conditions based on the parameters (p=p1, p2, p3 . . . ). The newN is the target number of resources, such as servers in a server group, and curN is the current number of resources allocated for an application, such as the current number of servers in a server group for the application. If the target number of servers is equal to the current number of servers, then, for example, there is no change instructed by the resource assessment computer system 120 running the above-described control plug-in. If the target number of servers is less than the current number of server, then the resource assessment computer system instructs the resource manager computer system 112 to flex up. If the target number of servers is greater than the current number of server, then the resource assessment computer system instructs the resource manager computer system 112 to flex down.

The parameters p used by the control function F may include "operational conditions" in the underlying controlled system, such as the load level in a server group. The parameters p may also describe the "desired conditions" such as boundaries or thresholds within which a control system operates, such as the control system 200 shown in FIG. 2 and described in detail below. Desired conditions also include preferences or constraints to be obeyed by the control system. An example is described below for a set of parameters p1 . . . p7 for a control function.

An example of a parameter set for operational conditions may include:
p1: LL (current load level in a server group);
p2: curN (current number of servers in a server group).

An example of a parameter set for desired conditions may include:
p3: LPSupp (upper threshold for load per server: (LL/curN), e.g. 80%);
p4: LPSlow (lower threshold for load per server: (LL/curN), e.g. 40%).

An example of hard constraints within the desired conditions may include:
p5: min.servers (minimal number of servers that must be maintained in the server group);
p6: max servers (maximal number of servers that must be maintained in the server group).

An example of preferences within the desired conditions may include:
p7: pref_LoadLevelPerServer (preferred load level of a server with: LPSlow≦pref_LoadLevelPerServer≦LPSupp).

The behavior of a control plug-in can be influenced by the parameter set p1 . . . p7. An example below includes a control function utilizing the parameter set p1 . . . p7. This control function is invoked any time a change in one of its input parameters p1 . . . p7 occurs, which may be reported to the resource assessment computer system 120 as a parameter change event from the data monitoring system 113.

int control Function(LL, curN)//arguments from parameter set p1 . . . p7
{LLPS=LL/curN; //current load level per server
newN=curN; //don't flex when LLPS remains within bounds
if (LLPS>LPSupp or LLPS<LPSupp or surplusControl)
{newN=RoundUp (LL/pref_LoadLevelPerServer);
newN=max(min(newN, max.Servers), min.servers);}
return newN;}

When the load per server exceeds the upper threshold or falls below the lower threshold, or the parameter set has changed, the new number of servers is calculated by:
newN=LL /pref LoadLevelPerServer.

The new number of servers is bound to constraints: newN=max(min(newN, max servers), min servers).

The control plug-ins are customizable. Adjusting any of the parameters describing desired conditions changes the control decisions made by the control plug-in. By providing a new or changing the existing parameter set p1 . . . p7, users, system administrators operators, or systems, such as a server surplus control system, can influence the result of the control function performed by the control plug-in. Also, control plug-ins may comprise software provided by the user, the system administrator, or another system. By using control plug-ins, the system 100 can easily receive and accommodate new policies for allocating the resources 111.

Furthermore, control plug-ins may be included in a hierarchal control plug-in architecture, where each intermediate layer in the hierarchy receives input that could change a parameter and generates an output, such as a control decision to change a parameter of a lower level control plug-in. At the bottom layer, the control plug-in's may output flex up or flex down instructions.

Figure 2:
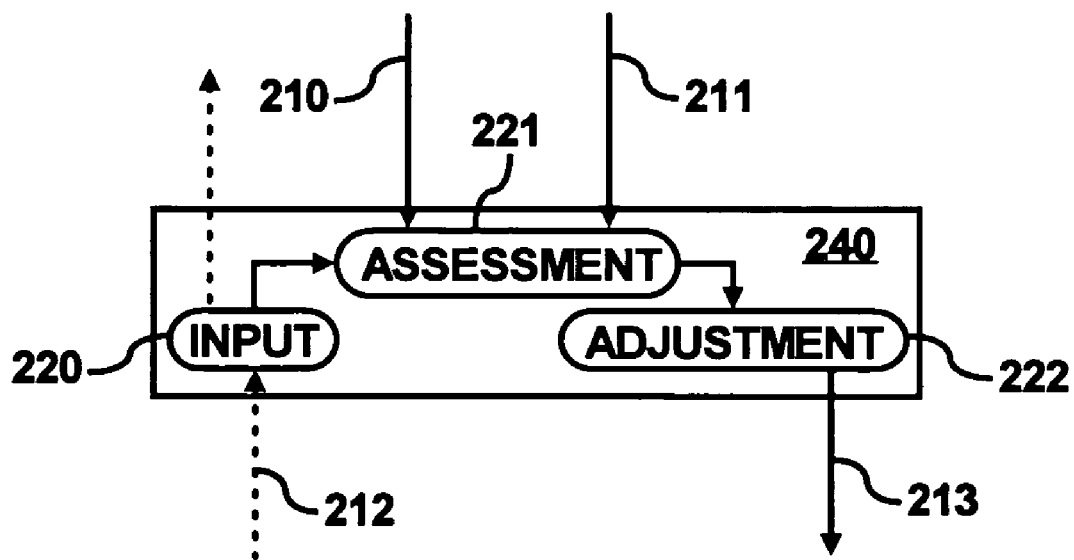
FIG. 2 illustrates a control plug-in structure, according to an embodiment.

FIG. 2 illustrates a structure 200 for control plug-ins that may be used in a hierarchal control plug-in architecture. The structure 200 may be used for a control plug-in at any level of the hierarchy. An example of a control system using a hierarchal control plug-in architecture is described below and shown in FIG. 3. The control plug-in structure 200 shown in FIG. 2 includes a flex control port 210, a life cycle delivery port 211, an event delivery port 212, and a control instruction output port 213. The structure 200 also includes an input function 220, an assessment function 221, and an adjustment function 222.

The flex control port 210 receives instructions from higher-level control plug-ins. Examples of instructions may include increase the number of servers in a server group to n number of servers or decrease the number of servers in a server group to x number of servers. Other examples may include increasing or decreasing the maximum or minimum number of server thresholds for a server group. A lower-level control plug-in may receive instructions to modify other types of parameters used by the control plug-in. Also, instructions may be received from the surplus controller 140 via the flex control port 210 to modify parameters for the control plug-in.

The life-cycle port 211 receives life-cycle instructions from higher-level control plug-ins. Examples of life cycle instructions may include instructions for managing the life cycle of a control loop, such as start, stop, suspend, and resume. Other life-cycle instructions may describe how control plug-ins enter and leave a control system, such as create a control plug-in for a particular farm, perform verification of requestor authenticity with the interface 130 shown in FIG. 1, disconnect a control plug-in from the resource manager 112 but maintain state, and destroy a disconnected control plug-in.

The event delivery port 212 receives information from lower-level control plug-ins. A control plug-in may subscribe to events determined or detected by a lower-level control plug-in or the data monitoring system 113 shown in FIG. 1. Examples of event information received via the event delivery port 212 may include the number of servers in a server group, a current farm state (active or inactive), and the number of servers in the server free pool 212, workload information (CPU utilization, memory utilization, etc.), and others. Events may be categorized by type, such as monitoring and farm life cycle, by topic, such as determined by a computer resource infrastructure, and by origin, such as a particular server group. Events may be subscribed to using these categories. Event subscription requests may be output to a lower-level control plug-in or the data monitoring system 113 via the control instruction output port 213. The control instruction output port 213 also outputs instructions to a lower-level control plug-in or the resource manager 111 for controlling the allocation of the computer resources 111. Instructions may include instructions to modify a parameter of a lower-level control plug-in or instructions to the resource manager 112 shown in FIG. 1 to adjust the allocation of resources.

Internally, each control plug-in includes three processing functions. The input function 220 receives information from lower-level control plug-ins via the event delivery port 212. The input function 220 may also receive monitoring data, which can be forwarded in part or all to higher-level control plug-ins depending on whether the higher-level control plug-ins subscribed to receive the monitoring data. This is one form of filtering performed by a control plug-in. The assessment control function 221 processes the input information using a control function and determines whether to adjust parameters for a lower-level control plug-in or to instruct the resource manager 111 shown in FIG. 1 to allocate computer resources, such as increasing or decreasing the number of servers in a server group. The assessment function 221 may also send processed information to a higher-level control plug-in, such as whether as the application is performing "in range" or not, or over which periods of time the application has performed "in range" or "out of range". The range may be related to workload or other factors.

The adjustment function 222 generates instructions, if needed, for adjusting parameters for the lower-level control plug-in or instructions for the resource manager 111 to adjust computer resources allocated for applications. The instructions are output via the control instruction output port 213. The assessment control function 221 and the adjustment function 222 may also generate and output event subscription requests.

A control plug-in may include software and the functions 220-222 of the structure 200 may be implemented as software modules. The ports may include software ports for sending and receiving the types of information described above.

Figure 3:
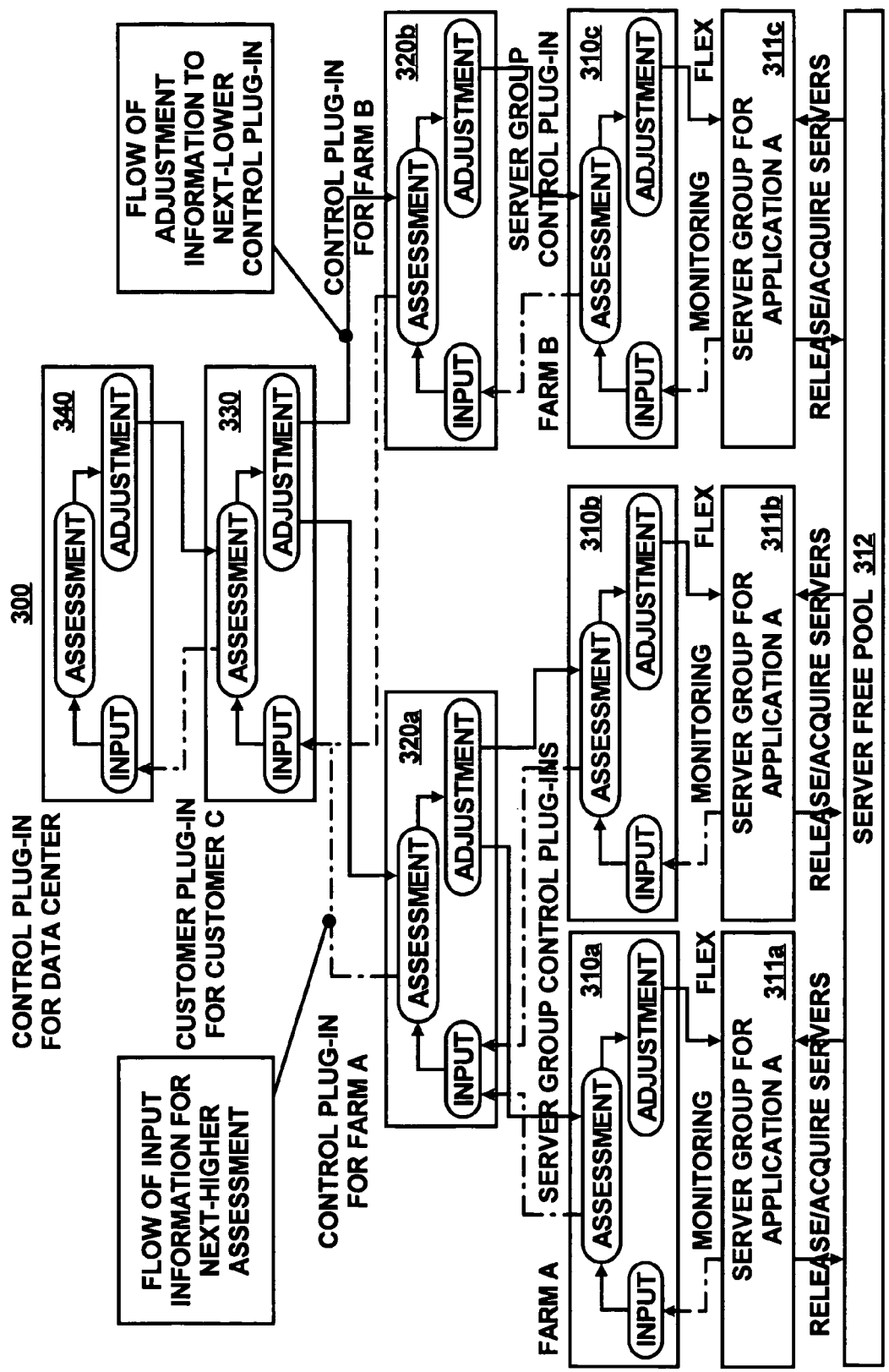
FIG. 3 illustrates control plug-ins arranged in a hierarchy in a control system, according to an embodiment.

FIG. 3 illustrates a hierarchal control system 300, which includes a control system having control plug-ins arranged in a hierarchy. In the example shown in FIG. 3, servers are the resources 111 of FIG. 1 that are released from or added to server groups running applications. It will be apparent to one of ordinary skill in the art that other types of resources may also be used. Also, control plug-ins are represented using the structure 200 shown in FIG. 2. Although only three ports are shown, such as an event delivery port, a control instruction output port and a flex control port, each of the control plug-ins in the system 300 may also include a life-cycle port. The data flow of input data to a control plug-in is illustrated using dotted lines and the data flow of output data from a control plug-in is illustrated using solid lines.

As shown in FIG. 3 and described in detail below, control plug-ins at intermediate levels may receive input data from lower level control plug-ins to make an assessment decision on whether to adjust parameters in a lower-level control plug-in, which may result in adjusting the allocation of servers for a server group.

The system 300 includes control plug-ins at different levels of the hierarchy. The control plug-ins may be stored and executed by the resource assessment computer system 120 of FIG. 1, which may include multiple servers running one or more of the control plug-ins. In the example shown in FIG. 3, control plug-ins 310a-c at the lowest level of the hierarchy in the system 300 are each responsible for flexing server groups, such as increasing or decreasing the number of servers in the server groups 311a-c based on control functions and parameters in the control plug-ins of the system 300. As the server groups 311a-c are flexed, servers are either released to or acquired from the server free pool 312. The server free pool 312 includes the servers currently not utilized. A single server free pool is shown in FIG. 3. However, a server free pool is provided for each application type. For example, web server application types utilize servers from a web server pool, and database application types utilize servers from a database server pool. Also, the server free pool 312 is part of the pool of resources 111 shown in FIG. 1 and is monitored by the data monitoring system 113.

The input data for the control plug-ins 310a-c may include monitoring data from the data monitoring system 113 shown in FIG. 1 measuring metrics for each server group. The output data may include instructions for flexing a server group if needed.

One or more server groups running an application are referred to as a farm. For example, the server groups 311a-b run instances of the application A and are in the farm A. The server group 311c is in the farm B and runs instances of the application B. The control plug-ins 320a-b are in an intermediate level of the hierarchy in the system 300 and include control functions for controlling farms. The control plug-ins 320a and 311a-b include control functions for allocating servers for the farm A, and the control plug-ins 320b and 310c include control functions for allocating servers for the farm B. The control plug-ins 320a-b receive data assessment information from respective lower level control plug-ins and may output adjustment data including adjusted parameters for the control functions of the respective lower level control plug-ins. Adjusted parameters may include new parameter values for a parameter set. The adjustment data may include but is not limited to revised thresholds for the parameters for the lower level plug-ins such that unutilized servers in the server free pool 312 are allocated or to re-allocate servers to server groups that need them.

The control plug-in 320 is at the customer level and includes control functions for administering policies, for example, for customer C. For example, customer C may desire better performance for application A, and thus new parameters may be output to the control plug-in 320a resulting in an increased number of servers being allocated for the server groups 311a-b. The control plug-in 340 is at the data center level and may include control functions for administering data center policies. For example, the servers in the server groups 311a-c and the server free pool 312 may be provided in a data center and subject to the policies of the data center.

At each level of the hierarchy shown in system 300, control plug-ins observe the conditions in underlying control plug-ins, such as through event information subscribed to by the respective plug-in. Monitoring data from the data monitoring system 113 shown in FIG. 1 may also flow upwards in the hierarchy. After evaluating conditions, taking into account instructions from higher-level control plug-ins, the control plug-ins make decisions that are propagated downwards the hierarchy to underlying target control plug-ins initiating the desired behavior there.

For example, the server group 311a that is controlled by a lowest-level control plug-in 310a. The server group 311a is considered "in range" based on parameters that specify the minimum number and maximum number of servers in the server group 311a for a predetermined load. The control plug-in 310a may not output instructions to the resource manager 112 to lower the number of servers in the server group 311a although the server group 311a might still be in range when operated with a few number servers based on the current load. A higher-level control plug-in, such as the control plug-in 320a, observes and recognizes this situation through event information received from the control plug-in 310a. When a new application is introduced or another server group, such as the server group 311b, approaches saturation due to increasing load or another reason exists that causes a need for additional servers, the control plug-in 320a instructs the control plug-in 310a to release servers from the server group 311a in order to meet additional demand that occurred at another place in the system 300. The control plug-in 310a generates instructions for the resource manager 112 to release servers from the server group 311a even though the control plug-in 310a would not have instructed the resource manager 112 to release servers from the server group 311a but for the "release server" instructions received from the control plug-in 320a.

In another example, instead of returning servers given up by other applications to the server free pool 312 and not using them at all, servers might be assigned to existing server groups improving their behavior. In this example, the higher-level control plug-in 320a may request the control plug-in 310a to increase the number of servers in the server group 311a.

Also, the control plug-in hierarchy provides a means for automating the execution of control policy. A policy at a higher level, such as the application level, customer level, or data center level may be modified. Instead of requiring system administrators to change parameters and possibly control functions in each lower-level of the hierarchy the control system 300 automates the procedure, saving time and lowering cost.

Figure 4:
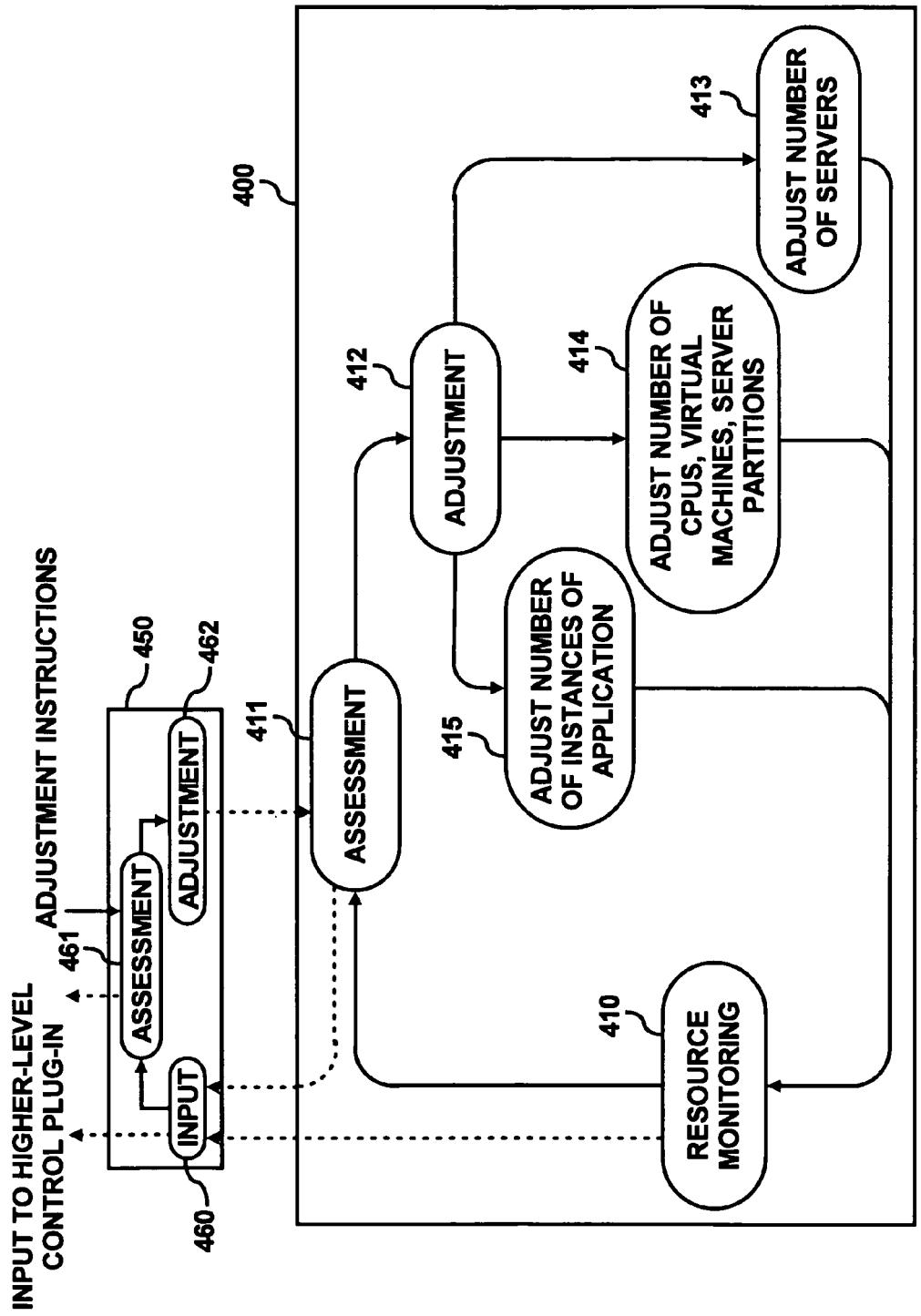
FIG. 4 illustrates control loops, according to an embodiment.

FIG. 4 illustrates two control loops 400 and 450 for control plug-ins at two different levels of a hierarchy, such as the control plug-ins 310a and 320a of FIG. 3. The control loop 400 includes resource monitoring 410 performed by data monitoring system 113 shown in FIG. 1. The control loop 400 includes assessment 411 which is performed using, for example, the control plug-in 310a shown in FIG. 3. The assessment 411 may include using a control function and parameters in the control plug-in 310a to determine whether to adjust the number of servers for the server group 311a. Parameters may include monitoring data from the resource monitoring. The assessment 411 may take into consideration instructions received from a higher-level plug-in. For example, the control plug-in 320a may instruct the control plug-in 310a to adjust one or parameters to implement a new control policy at the application, customer, or data center level.

The adjustment 412 includes generating instruction for adjusting allocated resources based on the assessment 411. Three examples of adjusting resources include adjusting the number of servers in a server group 413, adjusting the number of virtual machines, server partitions or CPUs 414, and adjusting the number of instances of a horizontally-scalable application 415. For 413 and 414, the number of computer systems may remain constant (e.g., the number of servers in a server group remains constant) while the number of instances of the application or the number of virtual machines, server partitions or CPUs may be adjusted by the resource manager computer system 112 of FIG. 1. For 415, the number of servers may be adjusted by the resource manager computer system 112. Also, the three adjustments 413-415 may be used as different levels of granularity. When a finer-grained adjustment, such as the adjustments 414 or 415, reaches its limits, the next level of adjustment, such as the adjustment 413 can be used to increase or decrease allocated resources. The different adjustments 413-415 may be used in any combination to adjust resources to meet the policies specified in the control plug-ins.

The control loop 450 includes functions performed by a higher-level control plug-in, such as the control plug-in 320a. The control loop 450 includes input 460. The input 460 includes two inputs from the control loop 400. One input may include input from the resource monitoring 410. This may include one or more metrics measured by the data monitoring system 113 shown in FIG. 1. Another input is from the assessment 411. This input may include information about the assessment status, such as the application is performing "in range" or not, or over which periods of time the application has performed "in range" and over which periods of time the application was assessed as "out of range".

The assessment 461 may include using the control function and parameters of the control plug-in 320a to determine control instructions for adjusting allocated resources. The assessment 461 may take into consideration instructions received from higher-level control plug-ins, such as the control plug-in 330a. The control loop 450 includes adjustment 450 for generating instructions to lower-level control plug-ins based on the assessment 461.

Figure 5:
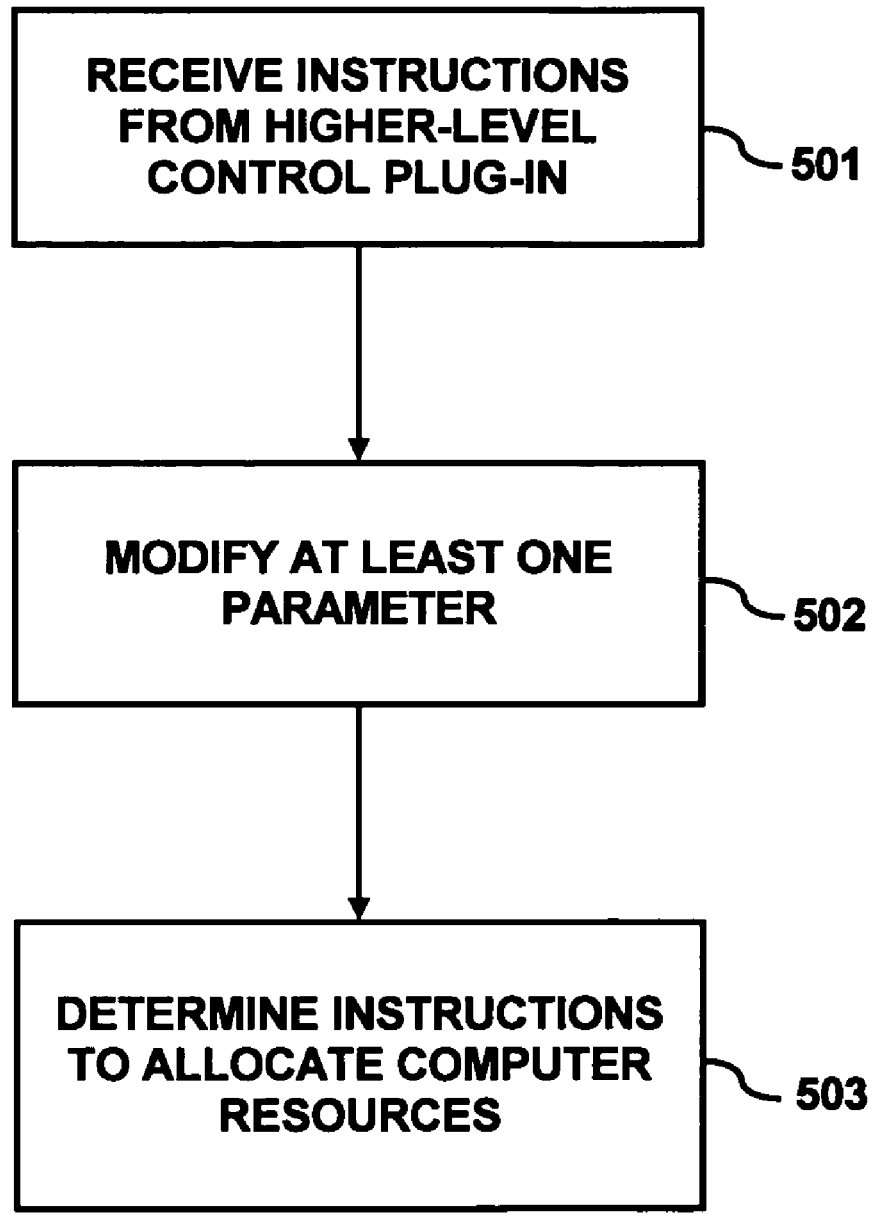
FIG. 5 illustrates a flow chart of a method for controlling the allocation of computer resources, according to an embodiment.

FIG. 5 illustrates a flow chart of a method 500 for controlling the allocation of computer resources, according to an embodiment. The method 500 is described with respect to FIGS. 1-4 by way of example and not limitation. For example, the method 500 is described with respect to steps performed by the control plug-in 310a shown in FIG. 3. The steps may also be performed by higher-level control plug-ins, such as the control plug-ins 320a-b, 330, and 340.

At step 501, the control plug-in 310a receives instructions from a higher-level control plug-in, such as the control plug-in 320a. The control plug-in 310a is a first-level control plug-in and the control plug-in 320a is a second-level control plug-in. A first-level control plug-in is in a lower level of the hierarchy shown in FIG. 3 than a second-level control plug-in. At step 502, the control plug-in 310a modifies at least one parameter of a plurality of parameters used to determine the allocation of computer resources, such as the allocation of the servers in the server group 311a. The control plug-in 310a may include a control function that uses a one or more of a plurality of parameters as input to determine whether to adjust the server group 311*a*. The control plug-in 320*a* may instruct the control plug-in 310*a* to modify one or more of the parameters to implement a new control policy, such as increasing the number of servers in the server group 311*a* in response to a new control policy for the application A requiring more servers. At step 503, the control plug-in 310*a* determines instructions to allocate the computer resources based on the plurality of parameters. For example, the control plug-in 310*a* determines instructions for the resource manager 112 shown in FIG. 1 to increase the number of servers in the server group 311*a* based on the plurality of parameters, including the modified parameter, and the control function for the control plug-in 310*a*.

The steps of the method 500 may be implemented as software embedded on a computer readable medium in the resource assessment computer system 120 shown in FIG. 1. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices and signals, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carrier or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

While the embodiments have been described with reference to examples, those skilled in the art will be able to make various modifications to the described embodiments without departing from the true spirit and scope. The terms and descriptions used herein are set forth by way of illustration only and are not meant as limitations. In particular, although the methods have been described by examples, steps of the methods may be performed in different orders than illustrated or simultaneously. Those skilled in the art will recognize that these and other variations are possible within the spirit and scope as defined in the following claims and their equivalents.

What is claimed is:

1. A control system having a processor for controlling an allocation of computer resources, the control system including a plurality of control plug-ins arranged in a hierarchy having multiple levels, the control system comprising:
    a first-level control plug-in of the plurality of the control plug-ins operable to generate instructions for a resource manager to allocate computer resources from a pool of computer resources for an application;
    a second-level control plug-in of the plurality of the control plug-ins operable to generate instructions for the first-level control plug-in to control the allocation of the computer resources for the application; and
    a third-level control plug-in for administering a policy for a customer and generating instructions for the second-level control plug-in based on the administered policy,
    wherein the second-level control plug-in generates the instructions for the first-level control plug-in based on assessment information received from the first-level control plug-in and the instructions received from the third-level control plug-in, and
    wherein the first-level control plug-in is operable to receive monitoring data from a data monitoring system monitoring metrics of the allocated computer resources and determine the instructions to send to the resource manager based on the monitoring data and parameters describing operational conditions in the first-level control plug-in.

2. The system of claim 1, wherein the assessment information includes events detected by the first-level control plug-in.

3. The system of claim 2, wherein the events comprise the monitoring data from the data monitoring system monitoring metrics of the allocated computer resources.

4. The system of claim 3, wherein the events comprise filtered parameters describing operational conditions from the first-level control plug-in.

5. The system of claim 1, wherein the first-level control plug-in is operable to modify at least one of the parameters based on the instructions generated by the second-level control plug-in.

6. The system of claim 1, wherein the allocated computer resources comprise at least one server group running the application.

7. The system of claim 6, wherein the application comprises a horizontally scalable application.

8. The system of claim 6, wherein the instructions operable to be generated by the second-level control plug-in comprise instructions for adding servers or releasing servers from the at least one server group.

9. The system of claim 1, further comprising:
    an interface providing security measures for communications between the first-level control plug-in and the resource manager.

10. The system of claim 9, wherein the security measures comprise at least one of encryption and verification of the first-level control plug-in.

11. The system of claim 1, wherein the control system is in a data center.

12. A method, performed by a computer system, comprising:
    receiving instructions at a first-level control plug-in from a second-level control plug-in in a hierarchal control system including a plurality of control plug-ins at different levels of the hierarchy;
    the first-level control plug-in modifying at least one parameter of a plurality of parameters to determine an allocation of computer resources from a pool of computer resources for an application;
    generating by a third-level control plug-in instructions for the second-level control plug-in based on a policy for a customer;
    the second-level control plug-in receiving the instructions from the third-level control plug-in and assessment information from the first-level control plug-in;
    the second-level control plug-in determining instructions for the first-level control plug-in to allocate the computer resources based on the received instructions from the third-level control plug-in and the assessment information from the first-level control plug-in;

the first-level control plug-in receiving monitoring data from a data monitoring system monitoring metrics of the allocated computer resources; and the first-level control plug-in determining instructions to send to a resource manager for allocating the computer resources based on the monitoring data and parameters describing operational conditions in the first-level control plug-in.

13. The method of claim 12, wherein determining instructions to allocate the computer resources further comprises determining instruction for at least one of adjusting a number of servers in a server group, adjusting a number of instances of an application, and adjusting a number of CPUs, server partitions, or virtual machines.

14. The method of claim 12, wherein the computer resources comprise servers executing a horizontally scalable application.

15. An intermediate-level control plug-in in a multi-level control system for controlling an allocation of computer resources, the intermediate-level control plug-in embodied on a non-transitory computer readable medium and comprising code, that when executed, causes a computer to perform the following:

an input function for receiving instructions from a customer control plug-in that administers a policy for a customer and receiving assessment data from a lower-level control plug-in;

an assessment function for determining whether to adjust a parameter in the lower-level control plug-in used to allocate the computer resources from a pool of computer resources for an application based on the instructions from the customer control plug-in and the assessment data from the lower-level control plug-in received by the input function; and an adjustment function for generating instructions to the lower-level control plug-in for adjusting the parameter in the lower-level control plug-in, wherein the lower-level control plug-in is operable to receive monitoring data from a data monitoring system monitoring metrics of the allocated computer resources and determine instructions to send to a resource manager based on the monitoring data and parameters describing operational conditions in the lower-level control plug-in.

16. A control system having a processor for controlling an allocation of computer resources, the control system including a plurality of control plug-ins arranged in a hierarchy having multiple levels, the control system comprising:

a first-level control plug-in of the plurality of the control plug-ins operable to generate instructions for a resource manager to allocate computer resources from a pool of computer resources for an application;

a second-level control plug-in of the plurality of the control plug-ins operable to generate instructions for the first-level control plug-in to control the allocation of the computer resources for the application; and a third-level control plug-in for administering a policy for a customer and generating instructions for the second-level control plug-in based on the administered policy, wherein the second-level control plug-in generates the instructions for the first-level control plug-in based on assessment information received from the first-level control plug-in and the instructions received from the third-level control plug-in, and wherein the assessment information includes events detected by the first-level control plug-in, the events comprising monitoring data from a data monitoring system monitoring metrics of the allocated computer resources and filtered parameters describing operational conditions from the first-level control plug-in.

17. A control system having a processor for controlling an allocation of computer resources, the control system including a plurality of control plug-ins arranged in a hierarchy having multiple levels, the control system comprising:

a first-level control plug-in of the plurality of the control plug-ins operable to generate instructions for a resource manager to allocate computer resources from a pool of computer resources for an application;

a second-level control plug-in of the plurality of the control plug-ins operable to generate instructions for the first-level control plug-in to control the allocation of the computer resources for the application;

a third-level control plug-in for administering a policy for a customer and generating instructions for the second-level control plug-in based on the administered policy; and an interface providing security measures for communications between the first-level control plug-in and the resource manager, the security measures comprising at least one of encryption and verification of the first-level control plug-in, wherein the second-level control plug-in generates the instructions for the first-level control plug-in based on assessment information received from the first-level control plug-in and the instructions received from the third-level control plug-in.

18. A method, performed by a computer system, comprising:

receiving first instructions at a first low-level control plug-in from an intermediate-level control plug-in in a hierarchal control system including a plurality of control plug-ins at different levels of the hierarchy;

the first low-level control plug-in modifying at least one parameter of a plurality of parameters in response to the first instructions, to determine an allocation of a first group of computer resources from a pool of computer resources for a first application;

sending allocation instructions from the first low-level control plug-in to a resource manager for allocating the first group of computer resources from the pool of computer resources for the first application;

receiving second instructions at a second low-level control plug-in from the intermediate-level control plug-in;

the second low-level control plug-in modifying at least one parameter of a plurality of parameters in response to the second instructions, to determine an allocation of a second group of computer resources from the pool of computer resources for a second application;

sending allocation instructions from the second low-level control plug-in to the resource manager for allocating the second group of computer resources from the pool of computer resources for the second application;

generating by a customer control plug-in instructions for the intermediate-level control plug-in based on a policy for a customer;

the intermediate-level control plug-in receiving the instructions from the customer control plug-in, first assessment information from the first low-level control plug-in, and second assessment information from the second low-level control plug-in to generate the first instructions for the first low-level control plug-in and the second instructions for the second low-level control plug-in;

the intermediate-level control plug-in receiving information indicating that the second group of computer resources requires an additional number of computer resources;

the intermediate-level control plug-in instructing the first low-level control plug-in to release a number of computer resources from the first group of computer resources to satisfy the additional number of computer resources required by the second group of computer resources, wherein the first low-level control plug-in is operable to receive monitoring data from a data monitoring system monitoring metrics of the first group of allocated computer resources and determine the allocation instructions to send to the resource manager based on the monitoring data and parameters describing operational conditions in the first low-level control plug-in.

\* \* \* \* \*